United States Patent
Hong et al.

(10) Patent No.: US 8,366,106 B2
(45) Date of Patent: Feb. 5, 2013

(54) SHEET PROCESSING APPARATUS

(75) Inventors: I-Chuan Hong, New Taipei (TW); Lung Chen, New Taipei (TW)

(73) Assignee: Foxlink Image Technology Co., Ltd., Taipei (TW)

( * ) Notice: Subject to any disclaimer, the term of this patent is extended or adjusted under 35 U.S.C. 154(b) by 6 days.

(21) Appl. No.: 13/161,795

(22) Filed: Jun. 16, 2011

(65) Prior Publication Data

US 2011/0241280 A1 Oct. 6, 2011

Related U.S. Application Data

(63) Continuation-in-part of application No. 12/696,408, filed on Jan. 29, 2010, now abandoned.

(51) Int. Cl.
*B65H 5/02* (2006.01)
*B65H 5/04* (2006.01)

(52) U.S. Cl. .................................. 271/274; 271/273

(58) Field of Classification Search .................. 271/273, 271/274

See application file for complete search history.

(56) References Cited

U.S. PATENT DOCUMENTS

| | | | | |
|---|---|---|---|---|
| 7,222,955 | B2 * | 5/2007 | Ohashi et al. | 347/104 |
| 7,384,034 | B2 * | 6/2008 | Nagura et al. | 271/125 |
| 7,427,065 | B2 * | 9/2008 | Maruyama | 271/274 |
| 7,905,486 | B2 * | 3/2011 | Abe | 271/274 |
| 8,196,925 | B2 * | 6/2012 | Richards et al. | 271/274 |
| 2006/0145416 | A1 * | 7/2006 | Giese | 271/273 |
| 2008/0042340 | A1 * | 2/2008 | Linder et al. | 271/274 |
| 2009/0224466 | A1 * | 9/2009 | Mitamura | 271/273 |
| 2011/0049801 | A1 * | 3/2011 | deJong et al. | 271/274 |

* cited by examiner

*Primary Examiner* — Prasad Gokhale

(74) *Attorney, Agent, or Firm* — WPAT, P.C.; Anthony King

(57) ABSTRACT

A sheet processing apparatus includes a sheet-table unit, a sheet-separating unit, a convey unit, a discharge unit, a sheet processing unit, and a sensor arranged at an upstream end of the convey unit and spaced from the discharge unit with a predetermined distance. The convey unit has at least one convey roller, at least one convey pulley, and an elastic device connected with the convey pulley. The elastic device has a stepping motor, a transmission system, a shaft and at least one torsional spring mounted on the shaft. Two ends of the torsional spring is connected with the convey pulley. When the signal resulted from a rear end of the sheet apart from the sensor is sent to the system controller, the stepping motor is commanded by the system controller to rotate the shaft. The torsional spring is twisted to make the convey pulley move away from but still contact with the convey roller.

6 Claims, 11 Drawing Sheets

SHEET PROCESSING APPARATUS

CROSS REFERENCE

This is a continuation-in-part of U.S. application Ser. No. 12/696,408, filed on Jan. 29, 2010, which is incorporated herewith by reference.

BACKGROUND OF THE INVENTION

1. Field of the Invention

The present invention relates to a sheet processing apparatus, and more specifically to a sheet processing apparatus having a feeding structure which improves the stability of sheet feeding.

2. The Related Art

Please refer to FIG. 1, a conventional sheet processing apparatus 100' comprises a sheet-separating unit 1' which includes a separating roller 11' and a first driving device 12', a sensor 2', a convey unit 3', a sheet-processing unit 4', a discharge unit 5', a second driving device 7' and a system controller 8'. The separating roller 11' is commanded by the first driving device 12' to rotate counterclockwise for separating and feeding a sheet (not shown). The convey unit 3' has a convey roller 31', a convey pulley 32' disposed against the convey roller 31', with a convey path 6' defined therebetween, a swingable arm 33' and a driving device 34'. The swingable arm 33' has one free end pivoted to the convey pulley 32', and the other free end connected to the driving device 34', thereby forcing the convey pulley 32' to move with respect to the convey roller 31' under the drive of the driving device 34'. Herein, the swingable arm 33' has a middle portion pivoted to a housing (not shown). The sheet-processing unit 4' is capable of scanning, printing and copying a plurality of sheets.

Take scanning the sheet for example, when the sheet processing apparatus 100' is in work, the plural sheets are disposed at an original end of the separating roller 11'. The separating roller 11' is urged by the first driving device 12' to rotate for feeding one sheet downstream along the convey path 6'. The sensor 2' detects a front end of the sheet and sends a signal to the system controller 8'. The second driving device 7' is accordingly commanded by the system controller 8' to operate the convey roller 31' and the discharge unit 5' to rotate. Consequently, the sheet will be conveyed downstream successively by the rotated convey roller 31' to process by the sheet-processing unit 4'. When the front end of the sheet reaches the discharge unit 5', a rear end of the sheet is still restrained between the convey roller 31' and the convey pulley 32'. At this time, the system controller 8' controls the driving device 34' to make the swingable arm 33' to swing so that the convey pulley 32' is moved away from the convey roller 31' with a small distance, releasing the conveying sheet. Thus the sheet will be conveyed only by the discharge unit 5', avoiding pulling and dragging the sheet.

However, since the sheet processing apparatus 100' provides with the swingable arm 33', served as a transitional element, for forcing the convey pulley 32' to butt against and separate the sheets from the convey roller 31', the assembling inaccuracy and the attrition of the swingable arm 33' is possible and apt to affect the engagement between the convey roller 31' and the convey pulley 32', as a result, having bad influence on the conveying stability for sheets.

SUMMARY OF THE INVENTION

A primary objective of the invention is to provide a sheet processing apparatus having a feeding structure which improves the stability of sheet feeding. In order to achieve the objective, a sheet processing apparatus adapted for processing a plurality of sheets according to a first embodiment of the present invention includes a sheet-table unit for holding the sheets, a sheet-separating unit disposed at a downstream end of the sheet-table unit along a convey direction of the sheets, for separating the sheets one by one and feeding the sheets downstream, a convey unit arranged at a downstream end of the sheet-separating unit along the convey direction of the sheets, for feeding the sheets downstream, a discharge unit located at a downstream end of the convey unit along the convey direction of the sheets, for discharging the sheets, a sheet processing unit placed between the convey unit and the discharge unit, and close to a convey path of the sheets, for processing the sheets, and a sensor arranged at an upstream end of the convey unit and spaced away from the discharge unit with a predetermined distance, for detecting the sheets and sending signals to a system controller. The convey unit has a convey roller, a convey pulley detachably resting against the convey roller, and an elastic device connected with the convey pulley. The elastic device has a cylinder, a fixing shaft having one end fixed to the cylinder, and a spring having two free ends fixed to the other end of the shaft and a portion of the convey pulley opposite to the convey roller. The convey pulley is forced by the spring to rest against the convey roller resiliently for conveying the sheet. When the signal resulted from a rear end of the sheet apart from the sensor is sent to the system controller, the cylinder is commanded by the system controller to draw back the fixing shaft. The spring is accordingly elongated to make the convey pulley away from the convey roller for releasing the conveying sheet.

As described above, the sheet processing apparatus is provided with the elastic device which is capable of forcing the convey pulley to rest against the convey roller for conveying the sheets stably, and separate the sheets from the convey roller before the front end of the sheet enters into the discharge unit, thereby releasing the rear end of the sheet for preventing from pulling and dragging the sheets. The elastic device is simple and convenient to manufacture and assemble. Furthermore, the elastic device provides the cylinder to make the convey pulley to move, which guarantees the constant engagement between the convey roller and the convey pulley in a long time use.

According to a second embodiment of the present invention, the sheet processing apparatus may have another form of the elastic device. The elastic device according to the second embodiment includes a stepping motor, a transmission system driven by the stepping motor, a shaft driven by the transmission system, at least one torsional spring mounted on the shaft. When the front end of the sheet arrives the convey unit or the rear end of the sheet leaves the convey unit, the stepping motor is commanded to drive the shaft to rotate. Thus, the torsional spring is twisted clockwise or counterclockwise, thereby making the convey pulley move in a direction toward or away from the convey roller and adjusting the pressure between the convey pulley and the convey roller. Because the stepping motor's position can be precisely controlled, the twisted angle and the twisted speed of the torsional spring can be easily controlled.

BRIEF DESCRIPTION OF THE DRAWINGS

The invention, together with its object and the advantages thereof may be best understood by reference to the following description taken in conjunction with the accompanying drawings, in which.

DETAILED DESCRIPTION OF THE EMBODIMENT

Figure 1:
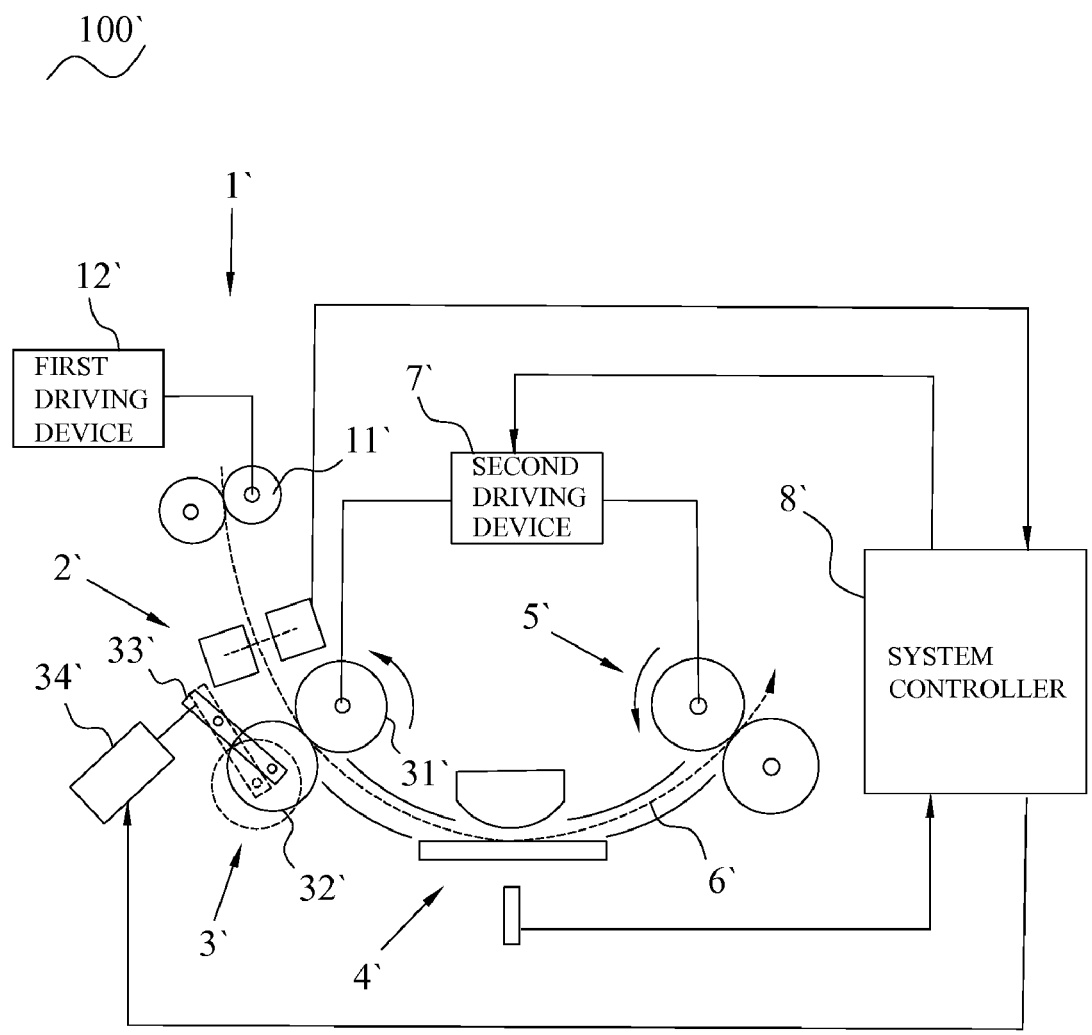
FIG. 1 is a schematic sectional view of a sheet processing apparatus in prior art.
Figure 2:
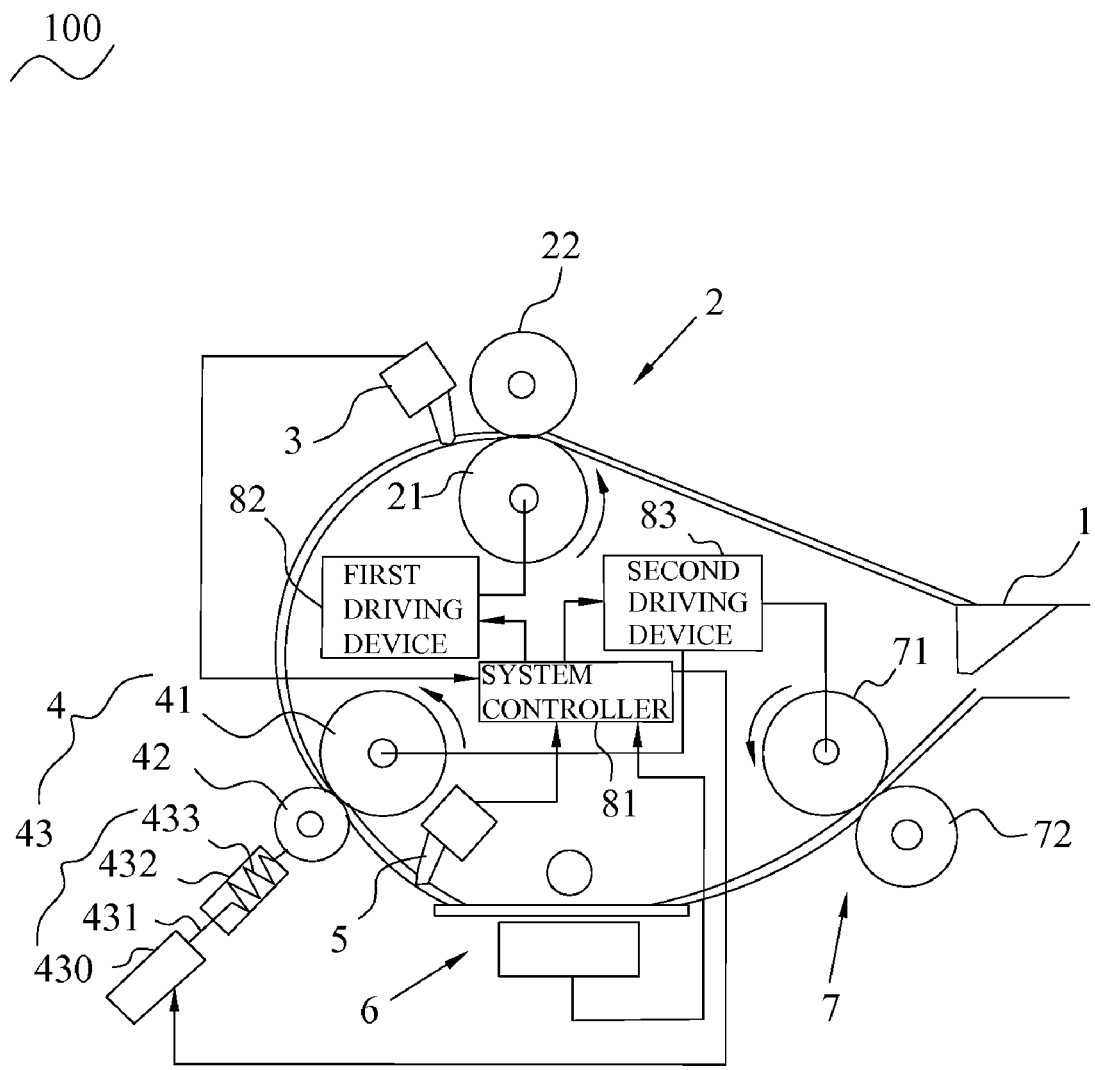
FIG. 2 is a schematic sectional view of a sheet processing apparatus according to a first embodiment of the present invention.
Figure 3:
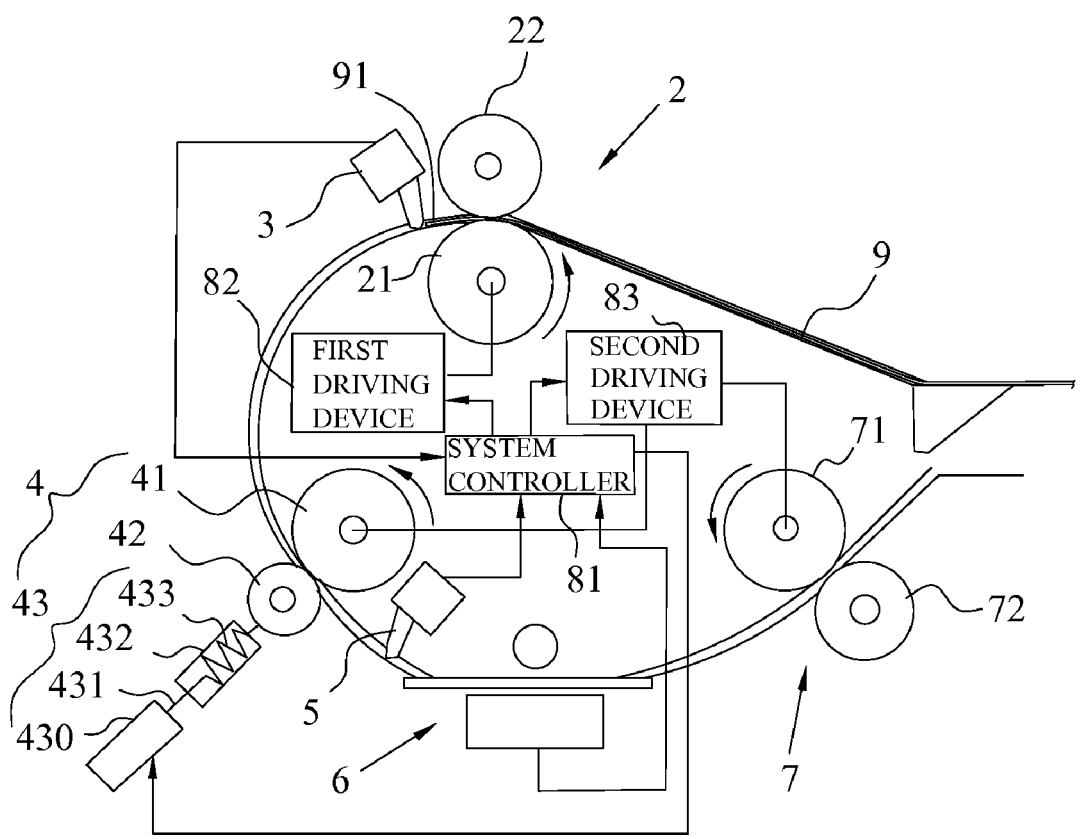
FIGS. 3-8 are schematic sectional views illustrating the different states of a sheet in the conveying process of the sheet processing apparatus shown in FIG. 2.

Referring to FIGS. 2-3, a sheet processing apparatus 100 according to a first embodiment of the present invention is shown. The sheet processing apparatus 100 comprises a sheet-table unit 1, a sheet-separating unit 2, a first sensor 3 connected with a system controller 81, a convey unit 4, a second sensor 5 connected with the system controller 81, a sheet-processing unit 6 connected with the system controller 81, and a discharging unit 7, with a convey path defined and passing therethrough for conveying a plurality of sheets 9.

Please refer to FIG. 3, the sheet-table unit 1 holds the sheets 9 and has a feeding device (not shown) for feeding the sheets 9 toward the downstream sheet-separating unit 2. The sheet-separating unit 2 has a separating roller 21 and a retard roller 22 disposed upon the separating roller 21, with a nip area formed therebetween. The retard roller 22 is controlled by a twisting device (not shown). A friction coefficient between the separating roller 21 and the sheet 9 is larger than that between the retard roller 22 and the sheet 9, for feeding each of the plural sheets 9 forwards. The friction coefficient between the retard roller 22 and the sheet 9 is larger than that between the two adjacent sheets 9, for stopping the plural sheets 9 from moving forwards except for the lowermost one. Herein, the retard roller 22 can be replaced by a retard pad. When the separating roller 21 is rotated counterclockwise, the lowermost sheet 9 is conveyed forward under the action of the friction force, but other sheets 9 is stopped by the retard roller 22, thereby separating the sheets 9 one by one.

The first sensor 3 is disposed at a downstream end of the sheet-separating unit 2, and close to the convey path of the sheets 9. The first sensor 3 has a sensor arm which is pushed by the sheets 9 from a position to another position and automatically returns the original position when the sheets 9 are departed therefrom. The first sensor 3 sends different signals to the system controller 81 when the sensor arm is located at different positions (two positions).

The convey unit 4 is disposed at a downstream end of the first sensor 3, and has a convey roller 41, a convey pulley 42 disposed against the convey roller 41, and an elastic device 43 connected with the convey pulley 42. The elastic device 43 has a cylinder 430, a fixing shaft 431, a barrel 432 and a spring 433. The fixing shaft 431 has one end fixed to the cylinder 430, and the other end connected with one free end of the spring 433. The spring 433 is received in the barrel 432 and has the other free end connected with a portion of the convey pulley 42 opposite to a portion of the convey pulley 42 resting against the convey roller 41 for providing the elastic force with the convey pulley 42 to make the convey pulley 42 rest against the convey roller 41 resiliently. The cylinder 430 is connected with the system controller 81.

The second sensor 5, which has a structure same as that of the first sensor 3, is disposed at a downstream end of the convey unit 4, and capable of detecting the sheet 9 when the sheet 9 is arrived thereat and sending a signal to the system controller 81. The sheet-processing unit 6 is disposed at a downstream end of the second sensor 5 and commanded by the system controller 81 for processing the sheets 9. The discharge unit 7 is disposed at a downstream end of the sheet-processing unit 6 and spaced away from the first sensor 3 with a predetermined distance. The discharge unit 7 has a discharge roller 71 and a discharge pulley 72 disposed against the discharge roller 71 for discharging the processed sheets 9. The system controller 81 is connected with the first sensor 3, the cylinder 430, the second sensor 5 and the sheet-processing unit 6. A first driving device 82 is commanded by the system controller 81 to force the separating roller 21 to rotate counterclockwise, and a second driving device 83 is commanded by the system controller 81 for driving the convey roller 41 and the discharge roller 71 to rotate counterclockwise.

Figure 4:
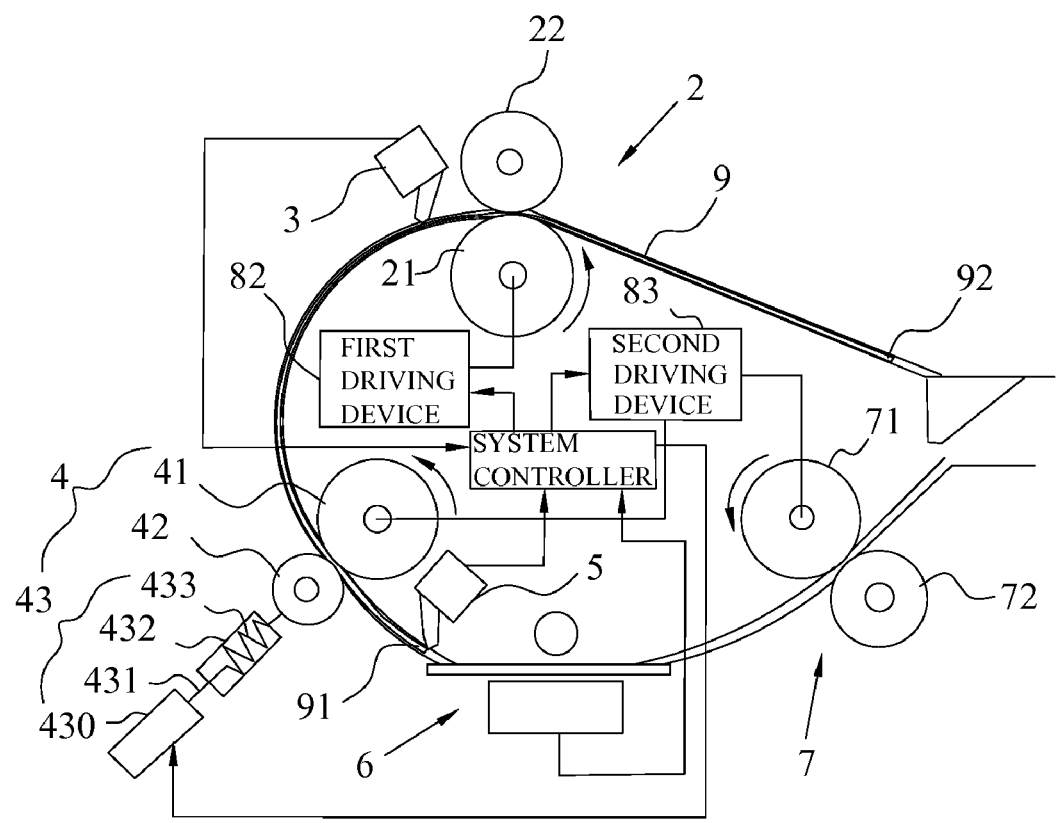

Please refer to FIGS. 2-4, when the sheet processing apparatus 100 is in work, at least one sheet 9 is put on the sheet-table unit 1, and conveyed to the nip area of sheet-separating unit 2. Herein, the sheet 9 defines a front end 91 and a rear end 92. The sheet-separating unit 2 separates and conveys one sheet 9 towards the first sensor 3. When the front end 91 arrives at the first sensor 3, the first sensor 3 detects the front end 91 and sends a signal to the system controller 81. Accordingly, the system controller 81 controls the second driving device 83 to drive the convey roller 41 and the discharge roller 71 to starting turning. Thus the convey roller 41 is able to convey the sheet 9 successively. When the front end 91 contacts the second sensor 5, the system controller 81 controls the sheet-processing unit 6 to start processing the sheet 9 at a proper time under the condition of receiving a signal from the second sensor 5.

Figure 5:
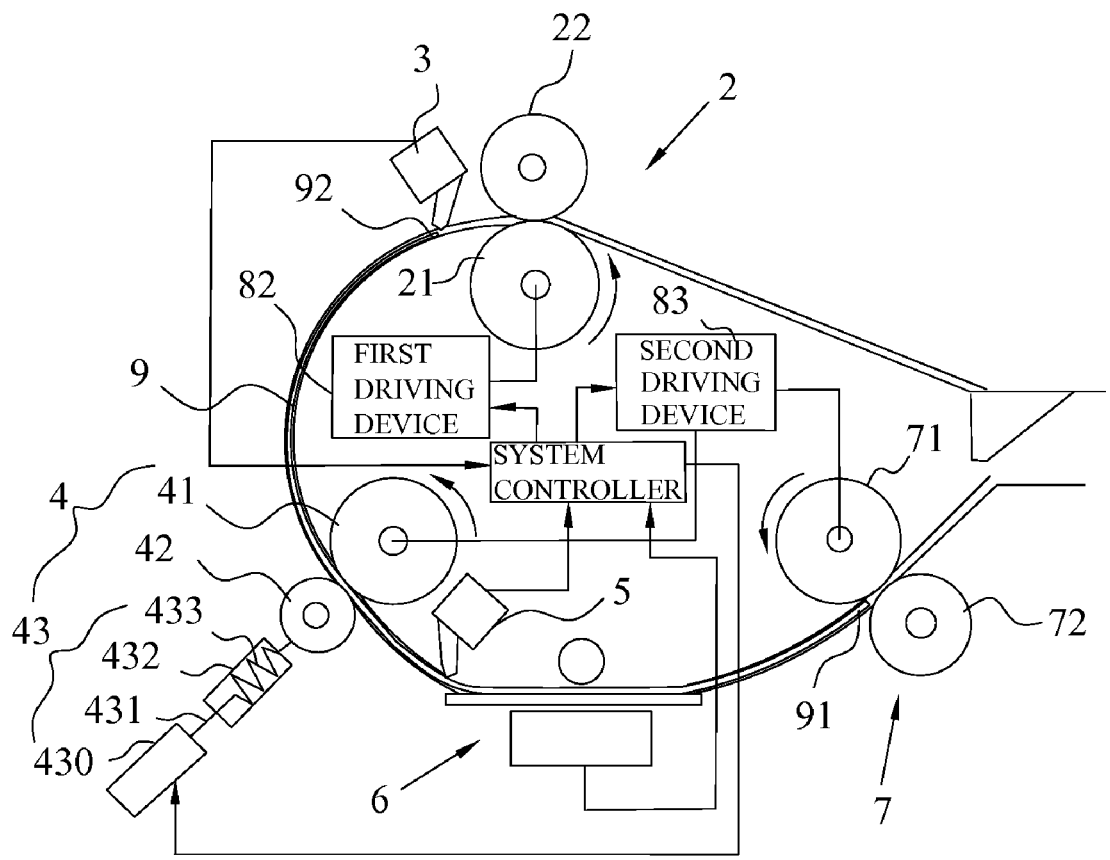
Figure 6:
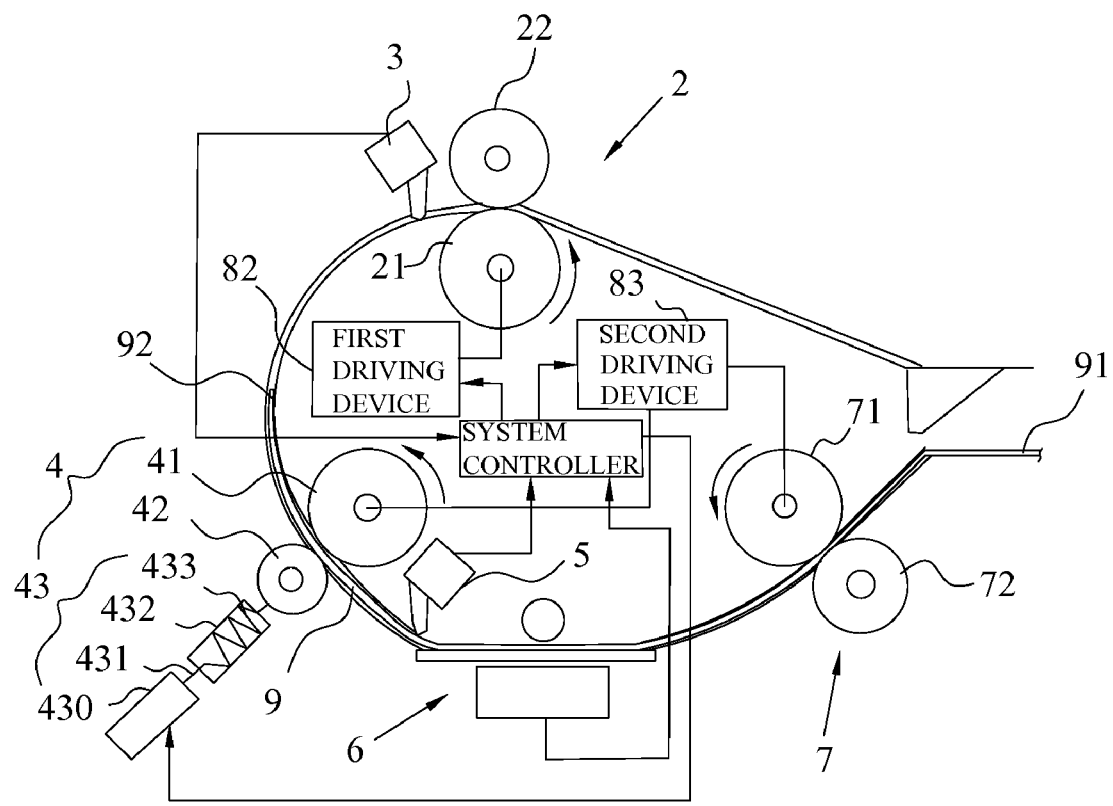
Figure 7:
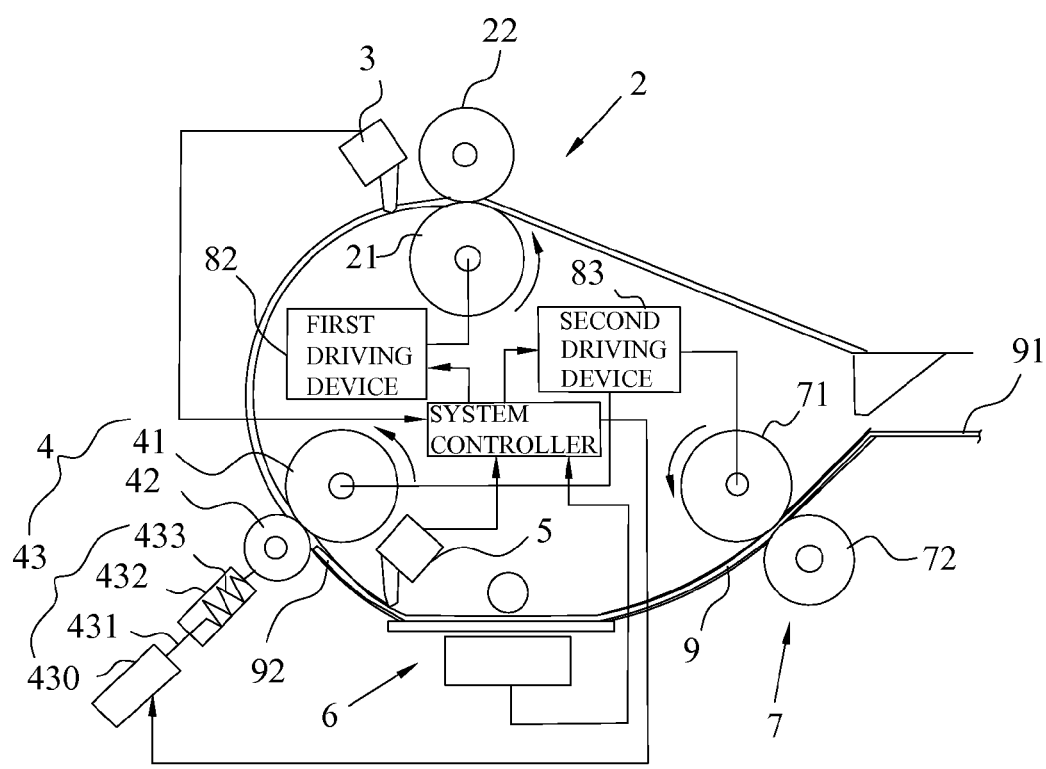

With reference to FIGS. 5-7, when the front end 91 of the sheet 9 is going to enter into a nip area of the discharge unit 7, the rear end 92 departs from the first sensor 3. The first sensor 3 generates and sends a signal to the system controller 81. The cylinder 430 of the elastic device 43, commanded by the system controller 81, forces the fixing shaft 431 to move towards the cylinder 430, elongating the spring 433. Consequently, the convey pulley 42 is urged by the spring 433 to move away from the convey roller 41 for reducing the pressing force acted on the sheet 9. The system controller 81 is capable of calculating the time course of the rear end 92 conveyed from the first sensor 3 to the convey unit 4, in accordance with the signal resulted from the rear end 92 leaving the first sensor 3, and setting the time point of the cylinder 430 driven by the second driving device 83 to release the spring 433 to return the original position, when the rear end 92 is apart from the convey unit 4.

Figure 8:
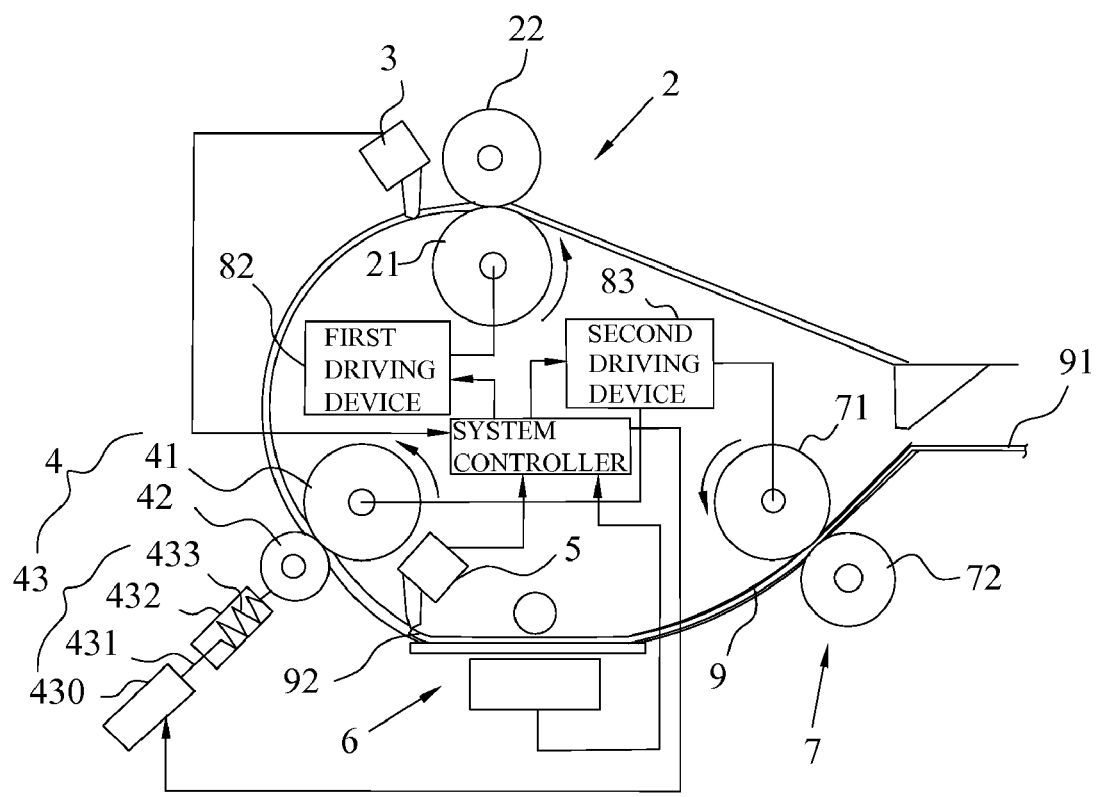

Referring to FIG. 8, the second sensor 5 sends a signal to the system controller 81 as the rear end 92 leaves therefrom. The system controller 81 is going to control the sheet-processing unit 6 to stop scanning the sheet 9 after a predetermined time course when the rear end 92 departs from a scanning center line of the sheet-processing unit 6. Thus the sheet 9 is processed and discharged by the discharge unit 7. The other sheets 9 are processed in the same manner as mentioned above.

Figure 9:
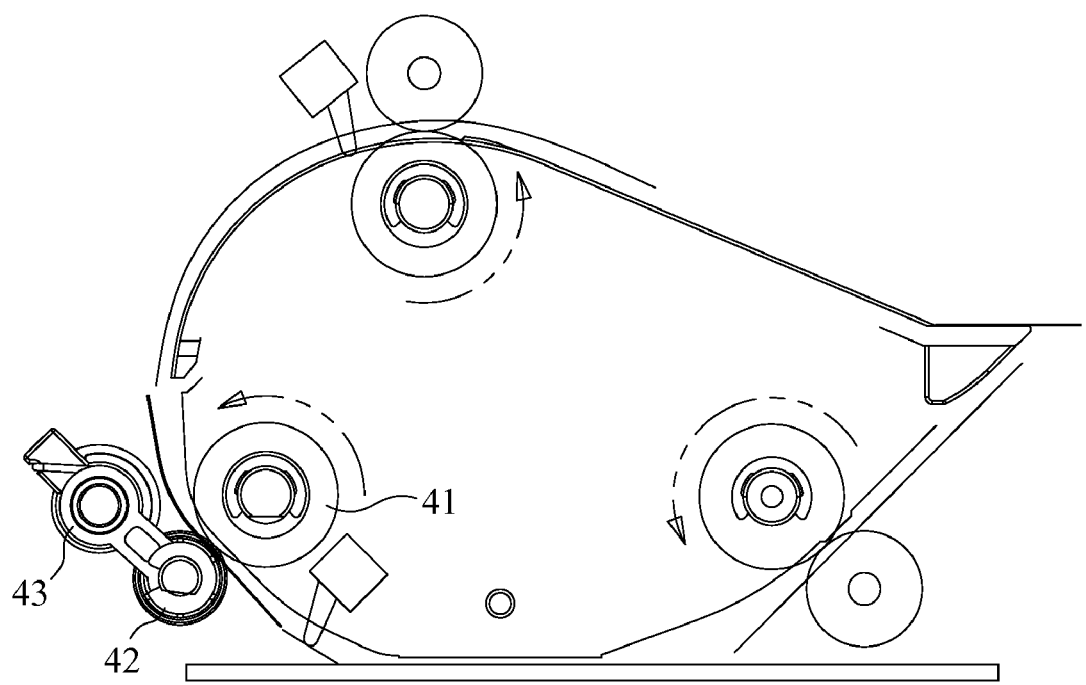
FIG. 9 is a schematic sectional view of a sheet processing apparatus according to a second embodiment of the present invention.
Figure 10:
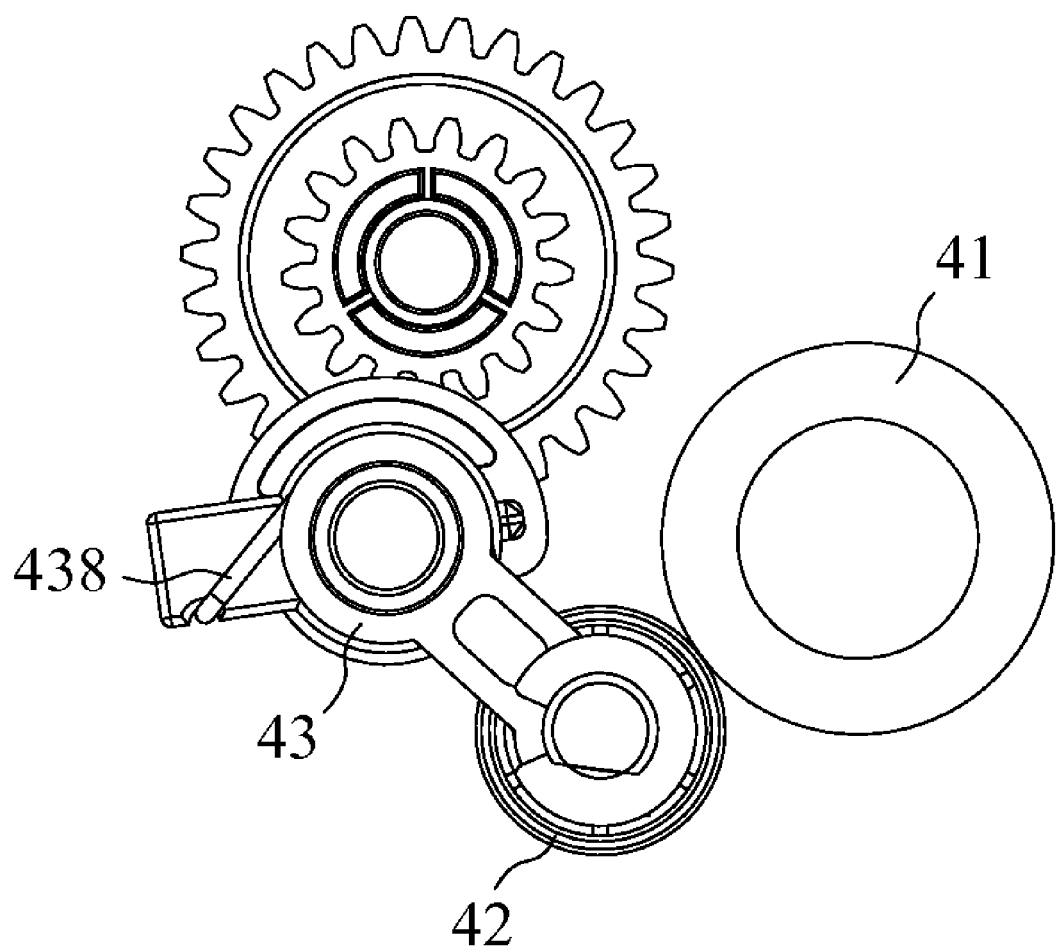
FIG. 10 is a schematic sectional view of a convey unit of the sheet processing apparatus shown in FIG. 9.
Figure 11:
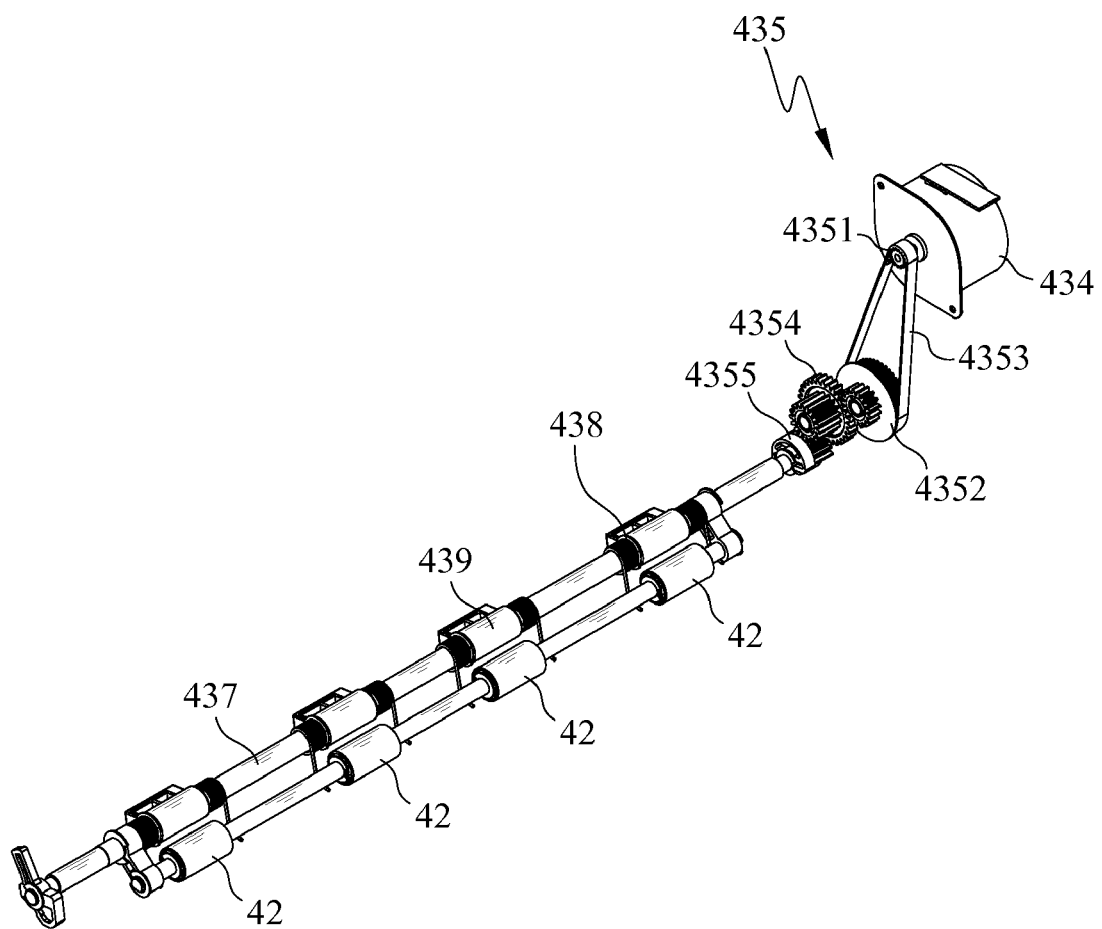
FIG. 11 is a schematic perspective view of the convey unit of the sheet processing apparatus shown in FIG. 9.

FIGS. 9-11 show a sheet processing apparatus 100 according to a second embodiment of the present invention, which is similar to the sheet processing apparatus 100 according to the first embodiment. The major difference between the first and second embodiment is the elastic device 43. The elastic device 43 according to the second embodiment includes a stepping motor 434, a transmission system 435, a shaft 437, at least one torsional spring 438 and a spring holder 439. The transmission system 435 includes a first belt pulley 4351, a second belt pulley 4352, a belt 4353, an idle gear 4354 and a shaft gear 4355. The stepping motor 434 and the second belt pulley 4352 are mounted in the sheet processing apparatus 100. The first belt pulley 4351 is connected with and driven by the stepping motor 434. The belt 4353 connects the first belt pulley 4351 and the second belt pulley 4352. The second belt pulley 4352 has a gear mounted at a side thereof to be engaged with the idle gear 4354. According to the second embodiment, the idle gear 4354 is a stepped gear. The torsional spring 438, the spring holder 439 and the shaft gear 4355 are mounted on the shaft 437. The shaft gear 4355 is disposed at one end of the shaft 437 and engaged with the idle gear 4354. Two ends of the torsional spring are connected with the convey pulley 42.

The sheet processing apparatuses 100 according to the first and second embodiments work in the similar way. When the front end 91 of the sheet 9 arrives at the first sensor 3, the first sensor 3 detects the front end 91 and sends a signal to the system controller 81. Accordingly, the system controller 81 controls the second driving device 83 to drive the convey roller 41 and the discharge roller 71 to starting rotating. Thus, the convey roller 41 can convey the sheet 9 successively. When the front end 91 contacts the second sensor 5, the system controller 81 controls the sheet-processing unit 6 to start image processing on the sheet 9.

Referring to FIG. 10, the system controller 81 calculates the time course of the front end 91 conveyed from the first sensor 3 to the convey unit 4, in accordance with the signal resulted from the front end 91 arriving the first sensor 3, and setting the time point of the stepping motor 434 begin to work. When the front end 91 enters the convey unit 4, the stepping motor 434 of the elastic device 43 is commanded by the system controller 81 to drive the first belt pulley 4351. The second belt pulley 4352 is driven to rotate by the belt 4353, the idle gear 4354 is driven to rotate by the gear of the second belt pulley 4352, the shaft gear 4355 is driven to rotate by the idle gear 4354 and the shaft 437 is co-rotated with the shaft gear 4355. Thus, a torque is applied on the torsional spring 438. Because the spring holder 439 is fixed on the shaft 437, the torsional spring 438 is also twisted by the spring holder 439. Therefore, the torsional spring 438 rotates counterclockwise and forces the convey pulley 42 to move toward the convey roller 41. The pressure between the convey roller 41 and the convey pulley 42 increases, which makes the sheet 9 conveyed smoothly. In the same way, the system controller 81 calculates the time course of the rear end 92 conveyed from the first sensor 3 to the convey unit 4. When the rear end 92 is going to leave the convey unit 4, the stepping motor 434 of the elastic device 43 is commanded by the system controller 81 to rotate in the opposite direction. Therefore, the torsional spring 438 rotates clockwise and forces the convey pulley 42 to slightly move away from but still contact with the convey roller 41. The pressure between the convey roller 41 and the convey pulley 42 decreases, which prevents the sheet dragging problem as the sheet 9 depart from the convey unit 4. Because the stepping motor's position can be precisely controlled, the twisted angle and the twisted speed can be easily controlled.

Referring to FIG. 11, the sheet processing apparatus 100 usually includes a plurality of the convey pulleys 42. In order to keep the pressure in balance, the convey pulley 42 is corresponding to the torsional spring 438 and the convey roller 41. Therefore, the numbers of the convey pulleys 42 are the same as those of the torsional springs 438 and the convey rollers 41.

As described above, the sheet processing apparatus 100 is provided with the elastic device 43 which is capable of forcing the convey pulley 42 to press against the convey roller 41 for conveying the sheets 9 stably, and separate from the convey roller 41 before the front end 91 of the sheet 9 enters into the discharge unit 7, thereby releasing the rear end 92 of the sheet 9 for preventing from pulling and dragging the sheets 9. The elastic device 43 is simple and convenient to manufacture and assemble. Furthermore, the elastic device 43 provides the helical spring 433 or the torsional spring 438, which guarantees the constant engagement between the convey roller 41 and the convey pulley 42 in a long time use. Moreover, the elastic device 43 according to the second embodiment may also be applied to the sheet-separating unit 2, the discharge unit 7 or other roller-pulley structures, thereby adjusting the pressure between the roller and the pulley.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A sheet processing apparatus adapted for processing a plurality of sheets, comprising:
   a sheet-table unit for holding the sheets;
   a sheet-separating unit disposed at a downstream end of the sheet-table unit along a convey direction of the sheets, for separating the sheets one by one and feeding the sheets downstream;
   a convey unit arranged at a downstream end of the sheet-separating unit along the convey direction of the sheets, for feeding the sheets downstream, the convey unit having at least one convey roller, at least one convey pulley corresponding to and detachably resting against the convey roller, and an elastic device connected with the convey pulley, the elastic device having a stepping motor, a transmission system driven by the stepping motor, a shaft connected with and driven by the transmission system, at least one torsional spring corresponding to the convey pulley, mounted on the shaft and having two free ends connected to the convey pulley;
   a discharge unit located at a downstream end of the convey unit along the convey direction of the sheets, for discharging the sheets;
   a sheet processing unit placed between the convey unit and the discharge unit, and close to a convey path of the sheets, for processing the sheets; and
   a sensor arranged at an upstream end of the convey unit and spaced away from the discharge unit with a predetermined distance, for detecting the sheets and sending signals to a system controller;
   wherein the convey pulley is forced by the torsional spring to rest against the convey roller resiliently for conveying the sheet, when the signal of a rear end of a sheet detected by the sensor at the sensor location is sent to the system controller, the stepping motor is commanded by the system controller to rotate the shaft, the torsional spring is accordingly twisted to move the convey pulley and reduce a pressure between the convey pulley and the convey roller for releasing the sheet;

wherein the system controller drives the convey roller to rotate when the system controller receives the signal resulted from the sensor detecting a front end of the sheet.

2. The sheet processing apparatus as set forth in claim 1, wherein the discharge unit has a discharge roller and a discharge pulley disposed against the discharge roller, the system controller controls the discharge roller to rotate when the system controller receives the signal resulted from the sensor detecting a front end of the sheet.

3. The sheet processing apparatus as set forth in claim 2, further comprising a driving device which is commanded by the system controller to drive the convey roller and the discharge roller to rotate.

4. The sheet processing apparatus as set forth in claim 1, wherein the sheet-separating unit has a separating roller and a retard roller disposed against the separating roller.

5. The sheet processing apparatus as set forth in claim 4, further comprising a first driving device which is commanded by the system controller to drive the separating roller to rotate for feeding the sheets.

6. The sheet processing apparatus as set forth in claim 1, wherein the elastic device further has a spring holder for holding the spring.

\* \* \* \* \*